United States Patent [19]

Secord

[11] Patent Number: 4,637,097

[45] Date of Patent: Jan. 20, 1987

[54] CABLE BUNDLER CLIP

[75] Inventor: Nelson W. Secord, Brighton, Mich.

[73] Assignee: Chrysler Motors Corporation, Highland Park, Mich.

[21] Appl. No.: 789,856

[22] Filed: Oct. 21, 1985

[51] Int. Cl.$^4$ ............................................. B65D 63/00
[52] U.S. Cl. .................................. 24/16 PB; 24/487; 24/521; 248/73
[58] Field of Search ............... 24/16 PB, 17 AP, 270, 24/22, 285, 122.3, 122.6, 457, 488, 459, 518, 24/521, 545, 556, 560–562, 571, 487; 248/73, 74, 248/74.3

[56] References Cited

U.S. PATENT DOCUMENTS

| | | |
|---|---|---|
| 2,397,680 | 4/1946 | Morehouse .................. 248/74.3 X |
| 2,997,531 | 8/1961 | Oldham ......................... 174/158 |
| 3,126,184 | 3/1964 | Kropp ............................ 248/73 |
| 3,154,277 | 10/1964 | Becker ........................... 248/73 |
| 3,913,187 | 10/1975 | Okuda ............................ 24/255 |
| 3,954,238 | 9/1974 | Nivet ............................. 248/68 |
| 4,029,277 | 6/1977 | Bulanda ......................... 248/74 |
| 4,179,774 | 12/1979 | Bradbury ..................... 24/521 X |
| 4,267,995 | 5/1981 | McMillan ....................... 248/74 |
| 4,426,754 | 1/1984 | Smith et al. ..................... 24/17 |
| 4,441,677 | 4/1984 | Byerly ......................... 248/74.3 |
| 4,526,756 | 7/1985 | Wong ...................... 24/16 PB X |

FOREIGN PATENT DOCUMENTS 2142376 1/1985 United Kingdom .................. 248/73

*Primary Examiner*—Kenneth J. Dorner
*Assistant Examiner*—Laurie K. Cranmer
*Attorney, Agent, or Firm*—Edward A. Craig

[57] ABSTRACT

The cable bundler clip includes a pair of clip halves hingedly connected together to permit opening of the clip for insertion of cables and closing of the clip for bundling of cables. Latching means are provided to maintain the clip in the closed position. An internal rib structure is provided with recesses for bundling three or less cables in a secure, parallel relationship.

4 Claims, 5 Drawing Figures

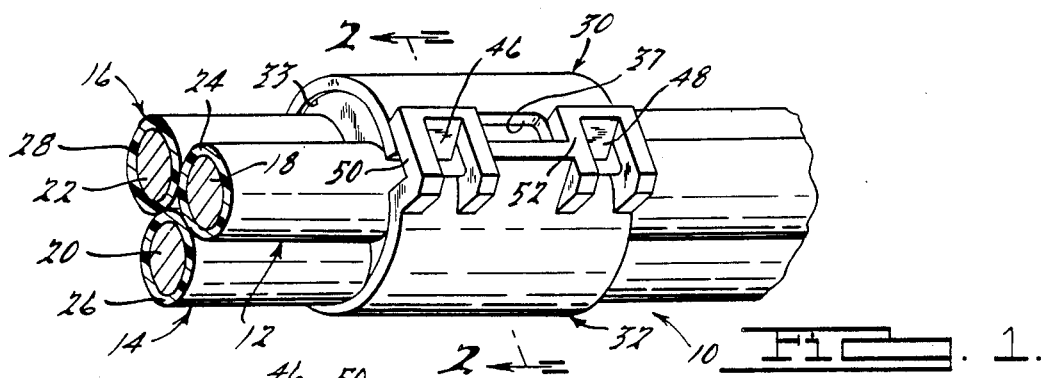
Fig. 1.
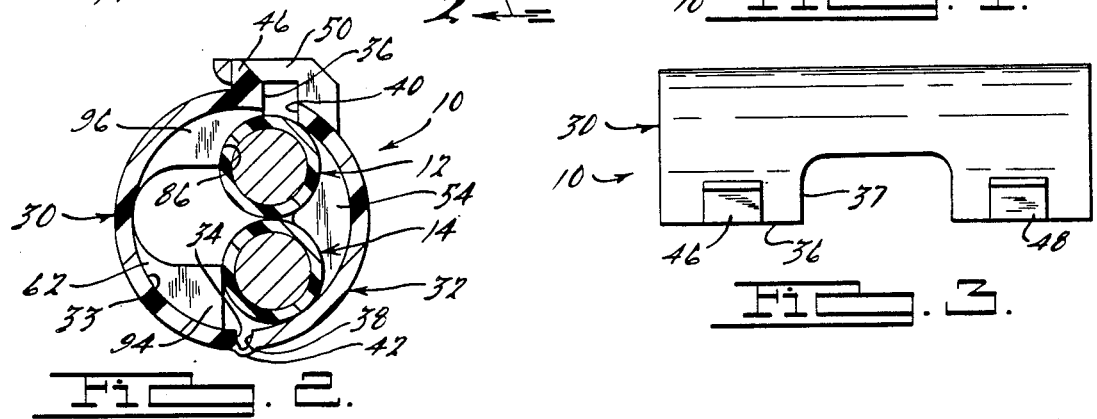
Fig. 2.
Fig. 3.
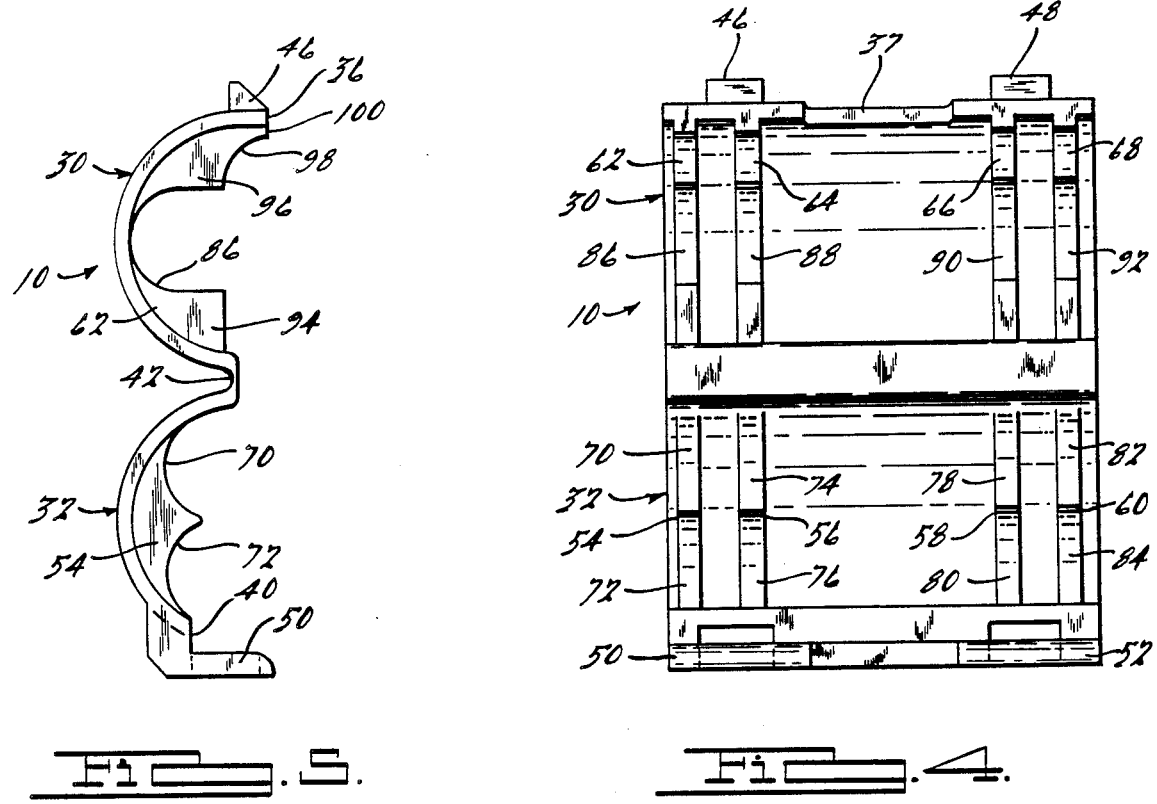
Fig. 5.
Fig. 4.

CABLE BUNDLER CLIP

BACKGROUND OF THE INVENTION

Conventionally, cables which are present in the same area of a vehicle are bundled together at spaced apart locations to prevent tangling and for aesthetic purposes. For example, it is desired in an automobile to bundle the throttle cable, the kick-down cable and the speed control cable together inasmuch as they are all present in about the same location, these cables extending from the vehicle firewall or floor area into the engine compartment. These cables are of the type, for example, operating on the Bowden principle and function as mechanical actuators. In the past, cable bundling has been accomplished by use of conventional tie straps of the type employing a plastic band which is tightened around the cables. Such tie straps have been effective in operation. However, tie straps suffer the disadvantage of requiring what is, by today's standards, an inordinate amount of labor to install. It is necessary for the assembler to first mount the strap and then tighten the strap tightly in place. Finally, he must clip off the excess portion of the strap. Further, tie straps do not result in bundling cables in a parallel relationship.

In accordance with the present invention, a cable bundler clip is provided which employs a simple latching mechanism, thus permitting rapid installation with a minimum amount of labor. The cable bundler clip is provided with discrete recesses for reception of individual cables thus permitting the cables to be arranged in parallel relationship. The cable bundler is further advantageous in that it will effectively and securely enclose either two or three cables in a bundle. Prior art bundling clamps have been proposed such as the clamp disclosed in U.S. Pat. No. 4,426,754. However, such clamps have not provided for securely bundling together a number of cables less than the number of cables for which the clamp is designed.

The present invention is also advantageous in that it is constructed to be of a minimum size thus avoiding a bulky appearance and saving space as well as the materials of fabrication. The cable bundler clip of the present invention results in the desired parallel arrangement of the cables with a resultant attractive appearance. The cable bundler clip also results in frictionally engaging the cables in a manner to prevent sliding of the clip along the length of the cables, this being true whether two or three cables are bundled.

SUMMARY OF THE INVENTION

The cable bundler clip comprises a clip structure including a pair of clip halves. Each clip half has a pair of longitudinal edges. A hinge connects adjacent edges of the clip halves thereby hingedly joining the halves together. The hinge permits the clip halves to be swung to a closed position wherein the other edges of the clip halves substantially meet to define an inner tubular surface which is used for enclosing a plurality of cables. A latching structure is provided on the clip halves for securing the clip halves together in the closed position.

A rib structure is provided within each of the clip halves. The rib structure within one clip half is oppositely disposed from the rib structure in the other clip half when the clip halves are in the closed position. The rib structure of one clip half has first and second side-by-side recesses formed therein. The rib structure of the other clip half has a third recess formed therein. The third recess is located centrally of the first and second recesses when the clip halves are in the closed position. Rib structure material of the other clip half is provided on each side of the third recess. This rib structure material overlaps the first and second recesses when the clip halves are in the closed position. Each of the recesses is adapted to receive a cable. The overlapping rib structure material of the other clip half securely captures cables received in the first and second recesses when the clip halves are in the closed position. Cables received in the first and second recesses securely capture a cable received in the third recess when the clip halves are in the closed position.

DESCRIPTION OF THE DRAWING

FIG. 1 is a view in perspective of one embodiment of the cable bundler clip of the present invention illustratively bundling three cables;

FIG. 2 is a sectional view taken substantially along the line 2—2 of FIG. 1 looking in the direction of the arrows with one of the cables removed to illustrate the condition when only two cables are bundled;

FIG. 3 is a side-elevational view of the cable bundler clip with the clip in the open position;

FIG. 4 is a plan view of the cable bundler as viewed from the bottom of FIG. 3; and FIG. 5 is an end view of the cable bundler clip as viewed from the left side of FIG. 4.

BRIEF DESCRIPTION OF A PREFERRED EMBODIMENT

Referring to FIGS. 1 and 2, it will be noted that the cable bundler clip 10 is capable of bundling either two or three cables 12, 14, 16. The cables 12, 14, 16 are mechanical-type cables used to actuate devices. They may, for example, be constructed on the Bowden principle or other cable structures as desired. The cables 12, 14, 16 each have a center mechanical actuating portion 18, 20, 22 which is covered by a sheath 24, 26, 28 of flexible material such as a plastic. The cables 12, 14, 16 are representatively automotive cables including a throttle cable, a kick-down cable and a speed control cable. Other cables, of course, can be bundled in accordance with the present invention.

The cable bundling clip 10 is composed of two halves 30, 32. The clip halves 30, 32 are semi-circular in cross-section and define an inner tubular surface 33 when in the closed position which is cylindrical in shape for enclosing a plurality of cables as shown in FIGS. 1 and 2.

The clip halves 30, 32 each have a pair of longitudinal edges 34, 36 and 38, 40. A hinge, which comprises a thin flexible web 42 connects adjacent edges 34, 38 thereby hingedly joining the halves 30, 32. The hinge permits the clip halves 30, 32 to be swung to a closed position as illustrated in FIGS. 1 and 2 or to an open position as illustrated in FIGS. 3, 4 and 5. When in the open position, the cables 12, 14, 16 may be inserted or removed. When the clip halves are swung to a closed position as shown in FIGS. 1 and 2, the other longitudinal edges 36, 40 substantially meet so that the halves define the inner tubular surface 33 for enclosing a plurality of cables, such as the cables 12, 14, 16.

A latching structure is provided on the clip halves for securing the clip halves together in the closed position. The latching structure comprises a pair of spaced apart triangular catches 46, 48 which are provided on the clip half 30 adjacent the edge 36. The edge 36 is cut away at 37 to permit independent flexing of the catches 46, 48. Mating latching elements 50, 52 are provided on the other clip half 32 for engaging the catches 46, 48 and thereby latching the clip halves 30, 32 in the closed position. To latch the clip in the closed position, it is only necessary to provide finger pressure against the clip halves 30, 32. The clip may be unlatched by manually raising the latching elements 50, 52 thereby releasing the catches 46, 48.

The entire clip structure is fabricated of a resilient but hard material such as nylon. This permits flexibility of the web 42 and latching structure while yet providing a structurally solid clip construction.

Rib structure is provided within each of the clip halves to securely engage the cables 12, 14, 16 and hold the cables in parallel relationship with respect to each other while frictionally engaging the cables to prevent sliding of the clip along the length of the cables. The rib structure comprises two spaced apart pairs of relatively thin ribs 54, 56 and 58, 60 in parallel relationship within one clip half 32 and oppositely disposed pairs of mating ribs 62, 64 and 66, 68 in the other clip half 30. These ribs are oppositely disposed and aligned when the clip halves are in the closed position. The ribs 54, 56, 58, 60 of the clip half 32 each have first and second side-by-side recesses 70, 72, 74, 76, 78, 80, 82, 84 formed therein. As will be noted in FIG. 5, the outer portions of the recesses are tangent to the inner surface of the clip half 32. This relationship reduces the overall size of the clip half thus resulting in an overall clip size which is smaller than would be the case if the tangential relationship did not exist.

Recesses 86, 88, 90, 92 are formed in the ribs 62, 64, 66, 68 of the other clip half 30. These recesses are located centrally of the first and second recesses when the clip halves are in the closed position as will be noted in FIG. 2. Rib structure material is provided for each of the ribs 62, 64, 66, 68, representatively at 94 and 96 of rib 62 as may be seen in FIG. 5. This rib structure is provided on each side of the rib recesses and overlaps the recesses of the other clip half 32 when the clip halves are in the closed position as will be noted in FIG. 2. Each of the recesses, that is the recess in the clip half 30 and the recesses in the clip half 32 are adapted to receive a cable 12, 14, 16. The overlapping rib structure material 94, 96 securely captures the cables 12, 14 when the clip halves are in the closed position. The cables 12, 14 in turn securely capture the other cable 16 when the clip halves are in the closed position when three cables are present as in FIG. 1. The cables are thus frictionally engaged thereby preventing the clip 10 from sliding along the length of the cables.

The rib structure material 96 has an arcuate segment 98 formed therein to accommodate the contour of the cable 12. A narrow section of rib material 100 extends from arcuate portion 98 to the edge 36 of the clip half 30. This material acts as a reinforcement and stiffener for the marginal edge portion of the clip half 30. This reinforcement results in a stiffer marginal edge portion of the clip half 30 thus resulting in a more secure connection of the catches 46, 48 with the latching elements 50, 52.

I claim:

1. In a cable bundler clip comprising a pair of clip halves, each clip half having a pair of longitudinal edges, a hinge connecting adjacent edges of the clip halves thereby hingedly joining the halves together, the hinge permitting the clip halves to be swung to a closed position wherein the other edges of the clip halves substantially meet to define an inner tubular surface for enclosing a plurality of cables, latching structure on the clip halves for securing the clip halves together in the closed position, the improvement comprising rib structure within each of the clip halves, the rib structure within one clip half being oppositely disposed from the rib structure in the other clip when the clip halves are in the closed position, the rib structure of one clip half having first and second side-by-side recesses formed therein, the rib structure of the other clip half having a third recess formed therein, the third recess being located centrally of the first and second recesses when the clip halves are in the closed position, rib structure material of said other clip half being provided on each side of the third recess, said rib structure material overlapping the first and second recesses when the clip halves are in the closed position, each of the recesses adapted to receive a cable, the overlapping rib structure material of said other clip half securely capturing cables received in the first and second recesses when the clip halves are in the closed position, cables received in the first and second recesses securely capturing a cable received in the third recess when the clip halves are in the closed position.

2. A cable bundler clip as defined in claim 1 further characterized in that said inner tubular surface defined by the clip halves when the clip halves are in the closed position is arcuate in cross-section, the first and second recesses being arcuate, portions of the first and second recesses being tangent to the inner surface of said one clip half.

3. A cable bundler clip as defined in claim 1, further characterized in the provision of rib structure material between the third recess and said other edge of the clip half to reinforce the marginal edge portion of said other clip half.

4. A cable bundler clip as defined in claim 1, further characterized in that said rib structure within each of the clip halves comprises a plurality of spaced apart relatively thin ribs.

* * * * *